US009822841B2

(12) United States Patent
Uehara et al.

(10) Patent No.: US 9,822,841 B2
(45) Date of Patent: Nov. 21, 2017

(54) FLYWHEEL ASSEMBLY (71) Applicant: EXEDY Corporation, Neyagawa-shi, Osaka (JP)

(72) Inventors: Hiroshi Uehara, Neyagawa (JP); Kazuhiro Koshi, Neyagawa (JP)

(73) Assignee: EXEDY Corporation, Neyagawa-shi, Osaka ( * ) Notice: Subject to any disclaimer, the term of this patent is extended or adjusted under 35 U.S.C. 154(b) by 0 days.

(21) Appl. No.: 15/023,318

(22) PCT Filed: Sep. 18, 2014

(86) PCT No.: PCT/JP2014/074653
§ 371 (c)(1),
(2) Date: Mar. 18, 2016

(87) PCT Pub. No.: WO2015/064237
PCT Pub. Date: May 7, 2015

(65) Prior Publication Data
US 2016/0230837 A1    Aug. 11, 2016

(30) Foreign Application Priority Data

Oct. 31, 2013  (JP) ................................ 2013-226768

(51) Int. Cl.
*F16F 15/30*       (2006.01)
*F16F 15/134*      (2006.01)

(52) U.S. Cl.
CPC ........ *F16F 15/13492* (2013.01); *F16F 15/30* (2013.01)

(58) Field of Classification Search
CPC . F16F 15/13492; F16F 15/13453; F16F 15/30
See application file for complete search history.

(56) References Cited

U.S. PATENT DOCUMENTS 5,065,642 A    11/1991  Kagiyama et al.
5,562,542 A *  10/1996  Rohrle .............. F16F 15/13438
                                                      464/63.1
(Continued)

FOREIGN PATENT DOCUMENTS

CN    1374466 A    10/2002
CN    102588459 A   7/2012
(Continued)

OTHER PUBLICATIONS

International Search Report dated Nov. 4, 2014 for PCT/JP2014/074653 (with English Translation).
(Continued)

*Primary Examiner* — Thomas C Diaz
(74) *Attorney, Agent, or Firm* — United IP Counselors, LLC (57) ABSTRACT A seat member includes a pressing part to be pressed by at least either of a first rotary member and a second rotary member. The seat member also includes a sliding part. The seat member is disposed to be changeable in posture between a first posture and a second posture, the first posture causing a radially outer part of the pressing part to be contacted to the at least either of the first rotary member and the second rotary member when an absolute value of a rotational angle of the second rotary member with respect to the first rotary member is less than a predetermined value, the second posture causing the sliding part to partially slide against the first rotary member when the absolute value of the rotational angle of the second rotary member with respect to the first rotary member is greater than or equal to the predetermined value.

6 Claims, 8 Drawing Sheets

(56) References Cited

U.S. PATENT DOCUMENTS

2002/0128074 A1  9/2002  Jackel et al.
2013/0035170 A1  2/2013  Uehara

FOREIGN PATENT DOCUMENTS

| | | |
|---|---|---|
| CN | 102597567 A | 7/2012 |
| CN | 102667228 A | 9/2012 |
| DE | 10209409 A1 | 9/2002 |
| DE | 102011014243 A1 | 9/2012 |
| FR | 2825436 A1 | 12/2002 |
| GB | 2374396 A | 10/2002 |
| JP | H319147 | 2/1991 |
| JP | 2002310238 A | 10/2002 |
| JP | 2011220409 A | 11/2011 |
| KR | 20020072203 A | 9/2002 |
| WO | 2011138894 A1 | 11/2011 |

OTHER PUBLICATIONS

Office Action dated Mar. 2, 2017 for Chinese Application No. 201480056251.X, 7 pp.

* cited by examiner

FLYWHEEL ASSEMBLY

CROSS-REFERENCES TO RELATED APPLICATIONS

This application is the U.S. National Phase of PCT International Application No. PCT/JP2014/074653, filed on Sep. 18, 2014. That application claims priority to Japanese Patent Application No. 2013-226768, filed Oct. 31, 2013. The contents of both applications are herein incorporated by reference in their entirety.

BACKGROUND

Technical Field

The present invention relates to a flywheel assembly.

Background Art

A variety of devices are embedded in a drive train of a vehicle in order to transmit power generated in an engine. For example, a clutch device and a flywheel assembly are assumable as this type of devices. A damper mechanism has been used for this type of devices in order to attenuate rotational vibrations (see e.g., Japan Laid-open Patent Application Publication No. 2011-220409).

SUMMARY

A well-known flywheel assembly includes a first flywheel, a second flywheel and a damper mechanism. The first flywheel is fixed to a crankshaft of an engine. The damper mechanism elastically couples the first flywheel and the second flywheel in a rotational direction.

Specifically, the damper mechanism includes a coil spring elastically coupling the first flywheel and the second flywheel in the rotational direction and spring seats disposed between the coil spring and at least either of the first flywheel and the second flywheel. The ends of the coil spring are supported by the spring seats. At least one at the spring seats includes a sliding part configured to slide against the first flywheel.

In this damper mechanism, power of the engine is configured to be transmitted from the first flywheel to the coil spring through the spring seat disposed between the first flywheel and the coil spring. Then, the power transmitted to the coil spring is configured to be transmitted from the coil spring to the second flywheel through the spring seat disposed between the coil spring and the second flywheel.

As described above, in the process of transmitting the power of the engine from the first flywheel to the second flywheel, the sliding part of the at least one spring seat, for instance, a radially outer part of the at least one spring seat, is configured to slide against the first flywheel. Accordingly, a sliding resistance of the at least one spring seat is produced. On the other hand, when a relative rotational angle between the first flywheel and the second flywheel increases, a centrifugal force acting on the damper mechanism also increases. In other words, the sliding resistance of the at least one spring seat also increases. Thus in the well-known art, the sliding resistance of the at least one spring seat acts in wide ranges from a low rotational speed range to a high rotational speed range. Hence, there is a possibility of degradation in attenuation performance of the coil spring.

It is an object of the present invention to enhance attenuation performance of a coil spring in wide rotational speed ranges.

Solution to Problems

A flywheel assembly according to a first aspect includes a first rotary member, a second rotary member, an elastic member and a plurality of seat members. The first rotary member is a member into which a power of an engine is inputted. The second rotary member is rotatably disposed with respect to the first rotary member. The elastic member elastically couples the first rotary member and the second rotary member in a rotational direction. The plurality of seat members are separately disposed between the elastic member and at least either of the first rotary member and the second rotary member.

At least one of the plurality of seat members includes a pressing part, which is configured to be pressed by the at least either of the first rotary member and the second rotary member, and a sliding part, which is configured to slide against the first rotary member. The at least one seat member is disposed to be changeable in posture between a first posture and a second posture. The first posture causes a radially outer part of the pressing part to be contacted to the at least either of the first rotary member and the second rotary member when an absolute value of a rotational angle of the second rotary member with respect to the first rotary member is less than a predetermined value. The second posture causes the sliding part of the at least one seat member to partially slide against the first rotary member when the absolute value of the rotational angle of the second rotary member with respect to the first rotary member is greater than or equal to the predetermined value.

According to the present flywheel assembly, when the first posture is taken, i.e., when the absolute value of the rotational angle of the second rotary member with respect to the first rotary member is less than the predetermined value, the radially outer part of the pressing part is configured to be contacted to at least either of the first rotary member and the second rotary member. In other words, power is transmitted to the at least one seat member through the radially outer part of the pressing part thereof. Thus, a radially inward force component of the power to be transmitted to the at least one seat member is increased, and hence, a centrifugal force acting on the at least one seat member can be reduced. Therefore, a sliding resistance of the at least one seat member can be reduced in, for instance, low to high rotational speed ranges. Consequently, attenuation performance of the elastic member can be enhanced.

On the other hand, when the second posture is taken, i.e., when the absolute value of the rotational angle of the second rotary member with respect to the first rotary member is greater than or equal to the predetermined value, the sliding part of the at least one seat member partially slides against the first rotary member. In this case, the sliding part of the at least one seat member partially slides against the first rotary member, and a load per unit area increases partially in the sliding part. Therefore, the sliding resistance does not greatly vary in magnitude from that produced when the sliding part of the at least one seat member entirely slides against the first rotary member. In other words, when the sliding part of the at least one seat member partially slides against the first rotary member, the sliding resistance to be herein produced has a similar magnitude to that to be produced when the sliding part of the at least one seat member entirely slides against the first rotary member.

However, for instance, the rotational speed of the engine in the high rotational speed range less varies than that in the low to high rotational speed ranges. Therefore, the elastic member can be expected to sufficiently exert attenuation performance even without intentionally reducing the sliding resistance of the at least one seat member.

Thus, according to the present flywheel assembly, the attenuation performance of the elastic member can be enhanced in the wide rotational speed ranges by reducing the sliding resistance of the at least one seat member in the low to high rotational speed ranges.

A flywheel assembly according to a second aspect relates to the flywheel assembly as in the first aspect, and wherein the first posture causes the pressing part to be partially contacted to the at least either of the first rotary member and the second rotary member on a side radially outward of an axis extending in a direction in which the elastic member is actuated.

In this case, when the first posture is taken, the power is configured to be transmitted to the at least one seat member from the side radially outward of the axis extending in the direction that the elastic member is actuated (e.g., a center axis of the elastic member). Hence, a centrifugal force acting on the at least one seat member can be reduced. In other words, the sliding resistance of the at least one seat member can be reduced in the high rotational speed range.

A flywheel assembly according to a third aspect relates to the flywheel assembly as in the first or second aspects, and wherein the first posture causes the sliding part to entirely slide against the first rotary member.

In this case, when the first posture is taken, the sliding part is configured to entirely slide against the first rotary member. However, as described above, the power of the engine is transmitted to the at least one seat member through the radially outer part of the at least one seat member. Hence, the centrifugal force acting on the at least one seat member can be reduced. In other words, the sliding resistance of the at least one seat member can be reduced in the high rotational speed range.

A flywheel assembly according to a fourth aspect relates to the flywheel assembly as in any of the first to third aspects, and wherein the at least one of the plurality of seat members is configured to be changed in posture between the first posture and the second posture by pivoting about the radially outer part of the pressing part as a fulcrum.

In this case, when pivoting, the at least one seat member is changed in posture between the first posture and the second posture. Specifically, when the absolute value of the rotational angle increases in a condition that the at least one seat member takes the first posture, the centrifugal force increases in accordance. Then, the at least one seat member pivots about the aforementioned fulcrum. Accordingly, the at least one seat member is changed in posture from the first posture to the second posture. Thus, the at least one seat member can be seamlessly changed in posture from the first posture to the second posture in accordance with the rotational angle.

A flywheel assembly according to a fifth aspect relates to the flywheel assembly as in any of the first to fourth aspects, and wherein the first posture is configured to produce a first gap between the pressing part and the at least either of the first rotary member and the second rotary member and on a side radially inward of the radially outer part of the pressing part. The second posture is configured to produce a second gap extending between the sliding part and the first rotary member in an opposite direction to the pressing part.

In this case, when the first posture is taken, the first gap is produced between the pressing part and the at least either of the first rotary member and the second rotary member as described above. When the second posture is taken, the second gap is produced between the sliding part and the first rotary member as described above. Accordingly, the at least one seat member can be easily changed in posture between the first posture and the second posture.

A flywheel assembly according to a sixth aspect relates to the flywheel assembly as in any of the first to fifth aspects, and wherein the seat members disposed between the elastic member and at least either of the first rotary member and the second rotary member include recesses for holding ends of the elastic member. Each of the first posture and the second posture is configured to produce a third gap between at least one of the recesses and the radially inner part of the elastic member.

In this case, when each of the first and second postures is taken, the third gap is produced between the radially inner part of the elastic member and at least one of the walls of the recesses. Accordingly, the at least one seat member can be easily changed in posture from the first posture to the second posture.

According to the present invention, attenuation performance of a coil spring can be enhanced in wide rotational speed ranges.

DETAILED DESCRIPTION OF EMBODIMENTS

<Entire Construction>

Using FIGS. 1 to 3, a flywheel assembly 1 will be explained. Its should be noted that only a first end seat 44*a* is shown among first spring seats 44 in FIGS. 3A and 3B. The construction and the posture of a second end seat 44*b* are the same as those of the first end seat 44*a*, and therefore, the second end seat 44*b* is not shown in FIGS. 3A and 3B.

The flywheel assembly 1 is a device for smoothly transmitting power generated in an engine to a transmission through a clutch device (not shown in the drawings). As shown in FIGS. 1 and 2, the flywheel assembly 1 includes a first flywheel 2 (exemplary first rotary member), a second flywheel 3 (exemplary second rotary member) and a damper mechanism 4.

The flywheel assembly 1 is herein constructed such that a transmission torque of each second spring 48 is set to be less than that of each first spring 49. Its should be noted that the term "transmission torque" is used for expressing a torque whereby actuation of each of the springs 49 and 48 is disabled.

<First Flywheel>

The first flywheel 2 is a member into which power generated in the engine is inputted. The first flywheel 2 is fixed to a crankshaft (not shown in the drawings) of the engine. As shown in FIGS. 1 and 2, the first flywheel 2 includes a first plate 21, a second plate 22 and a support member 23.

The first plate 21 includes a first plate body 21a, two first lateral parts 21b and a tubular part 21c axially extending from the outer periphery of the first plate body 21a and that of each first lateral part 21b.

Cuter peripheral parts 21e of the first plate body 21a are rotation-directional ends of the first lateral parts 21b. The outer peripheral parts 21e of the first plate body 21a are rotation-directionally contactable to the first spring seats 44 (to be described).

The first lateral parts 21h are parts bulging toward the engine than the first plate body 21a and are shaped by, for instance, stamping. The two first lateral parts 21b are disposed at equal pitches in the rotational direction. Each first lateral part 21b is formed in a range corresponding to two first springs 49 (to be described) and two second springs 48 (to be described).

The second plate 22 is an annular member fixed to the tubular part 21c and includes a second plate body 22a, two second lateral parts 22b and an inner tubular part 22c.

Outer peripheral parts 22e of the second plate body 22a are rotation-directional ends of the second lateral parts 22b. The outer peripheral parts 22e of the second plate body 22a are contactable to the first spring seats 44 (to be described) in the rotational direction. In other words, the outer peripheral parts 21e of the first plate body 21a and the outer peripheral parts 22e of the second plate body 22a are contactable to the first spring seats 44 in the rotational direction.

The second lateral parts 22b are parts bulging toward the transmission than the second plate body 22a and are shaped by, for instance, stamping. The two second lateral parts 22b are disposed at equal pitches in the rotational direction. Each second lateral part 22b is formed in a range corresponding to two first springs 49 and two second springs 48.

A relatively wide space for disposing the first springs 49 and the second springs 48 can be formed by disposing the second lateral parts 22b in opposition to the first lateral parts 21b in the outer peripheral part of the first flywheel 2. Each first spring seat 44 is supported by each first lateral part 21b and each second lateral part 22b in the rotational direction. The inner tubular part 22c is a tubular part extending from the inner peripheral part of the second plate body 22a toward the engine and is contacted to a seal ring 38.

The support member 23 is fixed to the first plate 21 by, for instance, rivets 27.

<Second Flywheel>

The second flywheel 3 is rotatably disposed with respect to the first flywheel 2. The second flywheel 3 includes a second flywheel body 31 and an output plate 33. The output plate 33 is fixed to the second flywheel body 31 by rivets 32.

The second flywheel 3 is supported by a bearing 39, while being rotatable with respect to the first flywheel 2.

The second flywheel body 31 is an annular member disposed on the transmission side of the second plate 22. The output plate 33 is disposed within an accommodation space S and is fixed to the second flywheel body 31. As shown in FIG. 1, the output plate 33 includes a body 33a having an annular shape and two transmission parts 33e extending from the body 33a in the radial direction. The body 33a is fixed to a support part 31a. Each transmission part 33e is a plate part and is disposed to be contactable to the first spring seats 44 in the rotational direction. The transmission parts 33e are configured to be disposed axially between the first plate body 21a and the second plate body 22a in a neutral state that power is not being transmitted from the engine to a clutch disc assembly through the flywheel assembly 1. Power transmitted to the first flywheel 2 is transmitted to each transmission part 33e through two first springs 49 and two second springs 48.

<Damper Mechanism>

The damper mechanism 4 is a mechanism elastically coupling the first flywheel 2 and the second flywheel 3 in the rotational direction. The damper mechanism 4 includes four first springs 49, four second springs 48, four first spring seats 44 (end seat members) and six second spring seats 43 (intermediate, seat members). The first springs 49 and the second springs 48 are exemplary elastic members. The damper mechanism 4 also includes the aforementioned first plate 21, second plate 22 and output plate 33.

Figure 1:
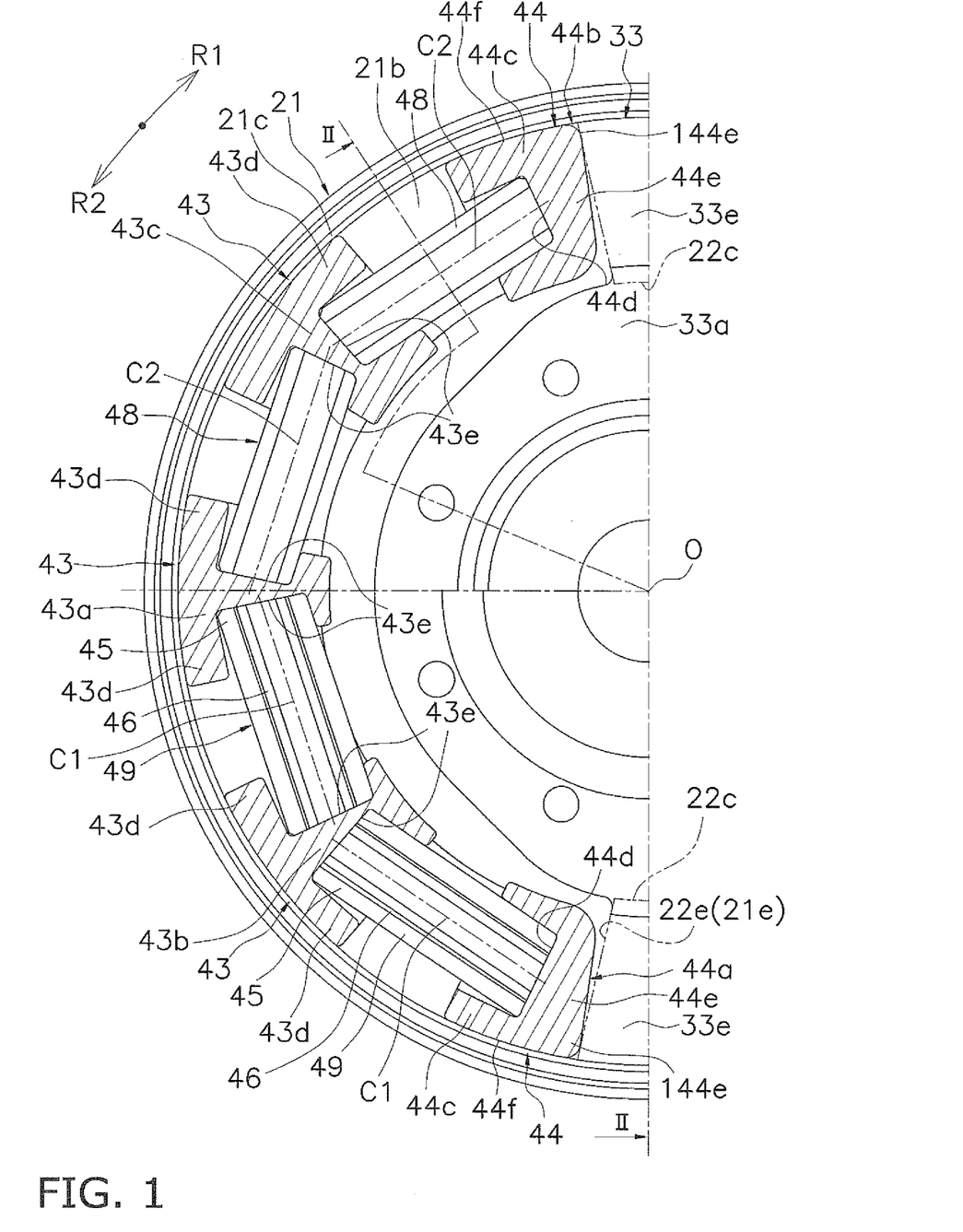
FIG. 1 is a plan view of a flywheel assembly according to an exemplary embodiment (neutral posture).
Figure 2:
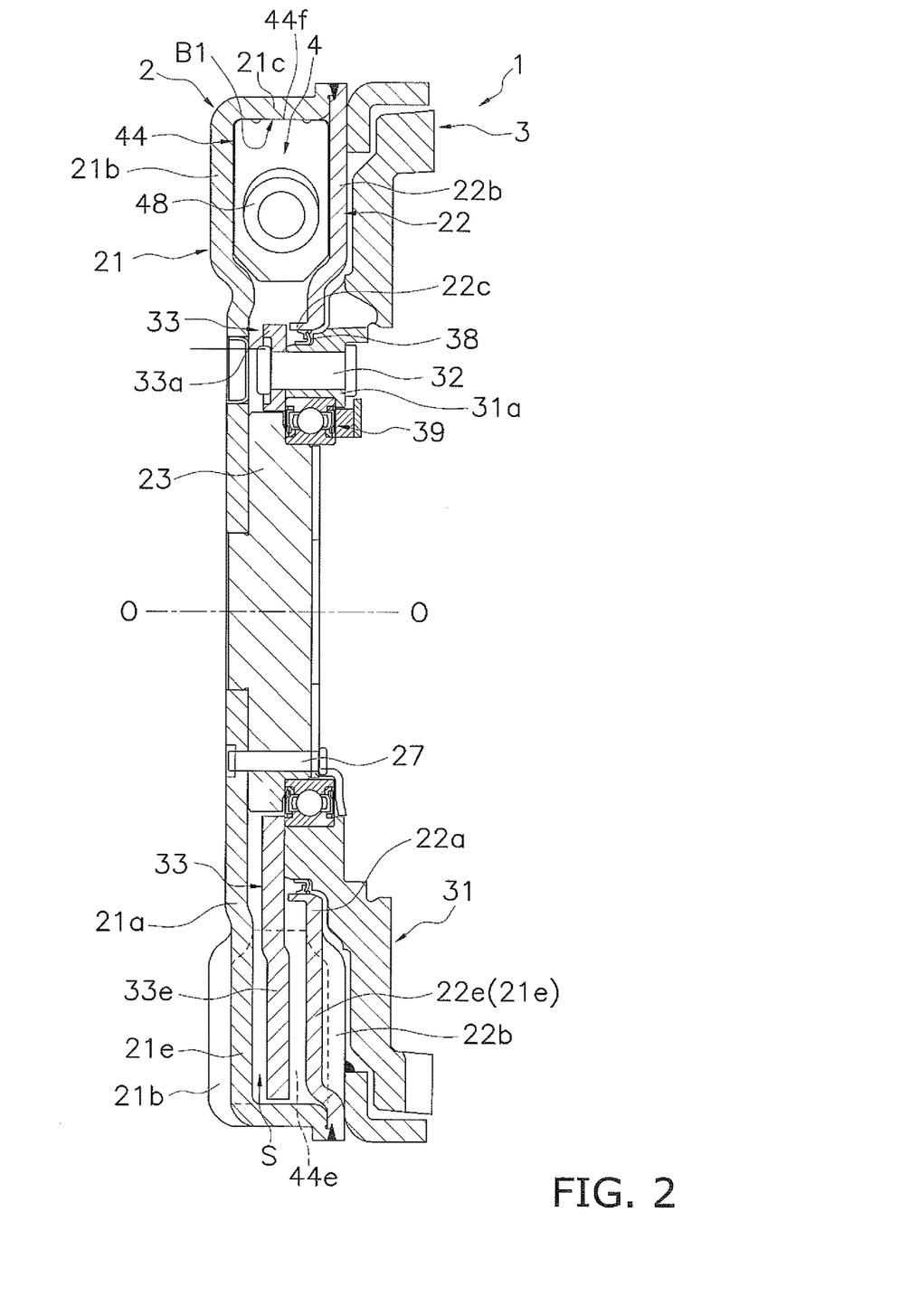
FIG. 2 is a cross-sectional view of FIG. 1 taken along line II-II.

As shown in FIG. 1, two first springs 49 and two second springs 48 are disposed between the first flywheel 2 and the second flywheel 3 to act in series. Specifically, two first springs 49 are disposed to act in series. Likewise, two second springs 48 are disposed to act in series. Moreover, two first springs 49 and two second springs 48 are disposed to act in series. Two second springs and two first springs 49 are disposed in a preliminarily compressed state within a first accommodation part B1 (see FIG. 2) formed by the first lateral part 21b, the second lateral part 22b and the tubular part 21c.

(1) First Springs 49

As shown in FIG. 1, the first springs 49 are disposed on a side to which acceleration-side power of the engine is outputted. When described in detail, the first springs 49 are disposed on a side to which power of the engine is outputted when the first flywheel 2 is rotated to a drive side (positive side; R2 direction).

Each first spring 49 includes a main spring 45 and a subsidiary spring 46. The subsidiary spring 46 is disposed inside the main spring 45 to act in parallel thereto. Each first spring 49 has a first center axis C1 extending roughly along the rotational direction. Each first spring 49 is elastically deformed along the first center axis C1. The first center axis C1 is herein a center axis set based on the outer contour of the first spring 49.

(2) Second Springs 48

Each second spring 48 is constructed such that the transmission torque thereof is less than that of each first spring 49. Here, the stiffness (K2) of each second spring 48 is set to be less than the stiffness (K1) of each first spring 49 (K2<K1). As shown in FIG. 1, the outer diameter of each second spring 48 is less than that of each first spring 49 (the outer diameter of the main spring 45). Each second spring 48 has a second center axis C2 extending roughly along the rotational direction. Each second spring 48 is elastically deformed along the second center axis C2. The second center axis C2 is herein a center axis set based on the outer contour of the second spring 48.

(3) First Spring Seats 44

In the neutral state that power is not being transmitted from the engine to the clutch disc assembly through the flywheel assembly 1, the first spring seats 44 are rotation-directionally contacted to the outer peripheral parts 21e (the rotation-directional ends of each first lateral part 21b) of the first plate body 21a and the outer peripheral parts 22e (the rotation-directional ends of each second lateral part 22b) of the second plate body 22a. Additionally, the first spring seats 44 are contactable to the transmission parts 33e of the output plate 33.

As shown in FIG. 1, a pair of first spring seats 44 is composed of the first end seat 44a and the second end seat 44b. The first end seat 44a is one of the single pair of first spring seats 44. The first end seat 44a supports one end of one of the first springs 49. Specifically, the first end seat 44a supports the end of the first spring 49 in both of the radial direction and the axial direction. The second end seat 44b is the other of the single pair of first spring seats 44. The second end seat 44b supports one end of one of the second springs 48. Specifically, the second end seat 44b supports the end of the second spring 48 in both of the radial direction and the axial direction.

When described in detail, each of the first and second end seats 44a and 44b has a tubular shape. Each of the first and second end seats 44a and 44b has a tubular part 44c and a bottom part 44d.

The end of the first spring 49 is inserted into the tubular part 44c (exemplary recess) of the first end seat 44a. The top of the end of the first spring 49 is contacted to the bottom part 44d of the first end seat 44a. On the other hand, the end of the second spring 48 is inserted into the tubular part 44c (exemplary recess) of the second end seat 44b. The tip of the end of the second spring 48 is contacted to the bottom part 44d of the second end seat 44b.

Thus, the tubular part 44c is formed in each first spring seat 44, i.e., each of the first and second end seats 44a and 44b, and a relevant spring (the first spring 49 or the second spring 48) is mounted to the tubular part 44c. Accordingly, each first spring seat 44 can be entirely enhanced in strength and can reliably support its relevant spring.

Figure 3A:
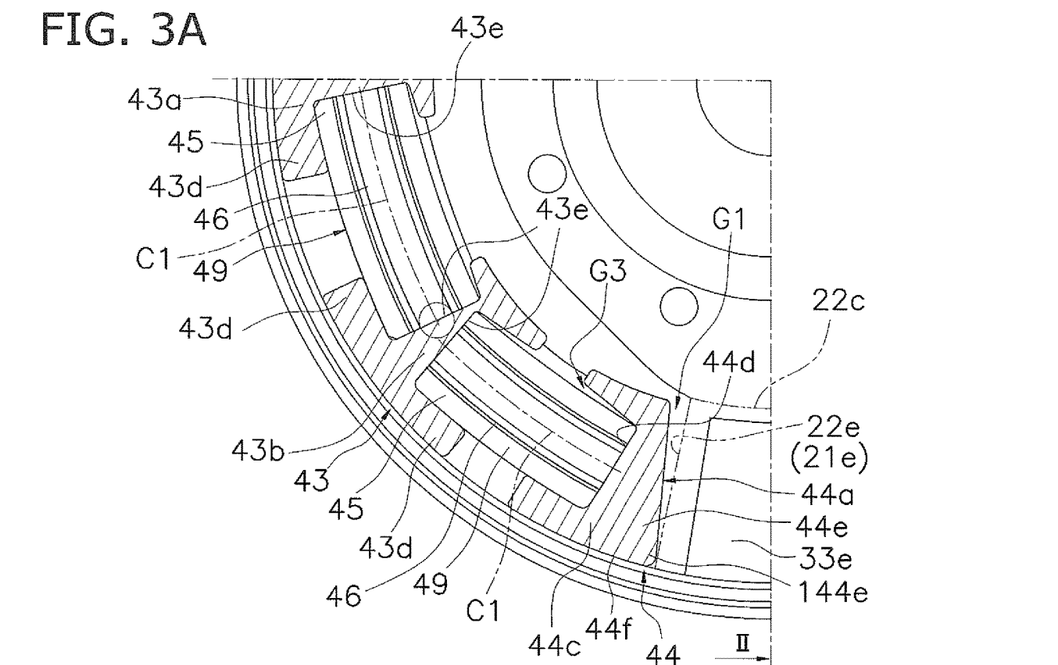
FIG. 3A is a partial enlarged plan view of the flywheel assembly (first posture).
Figure 3B:
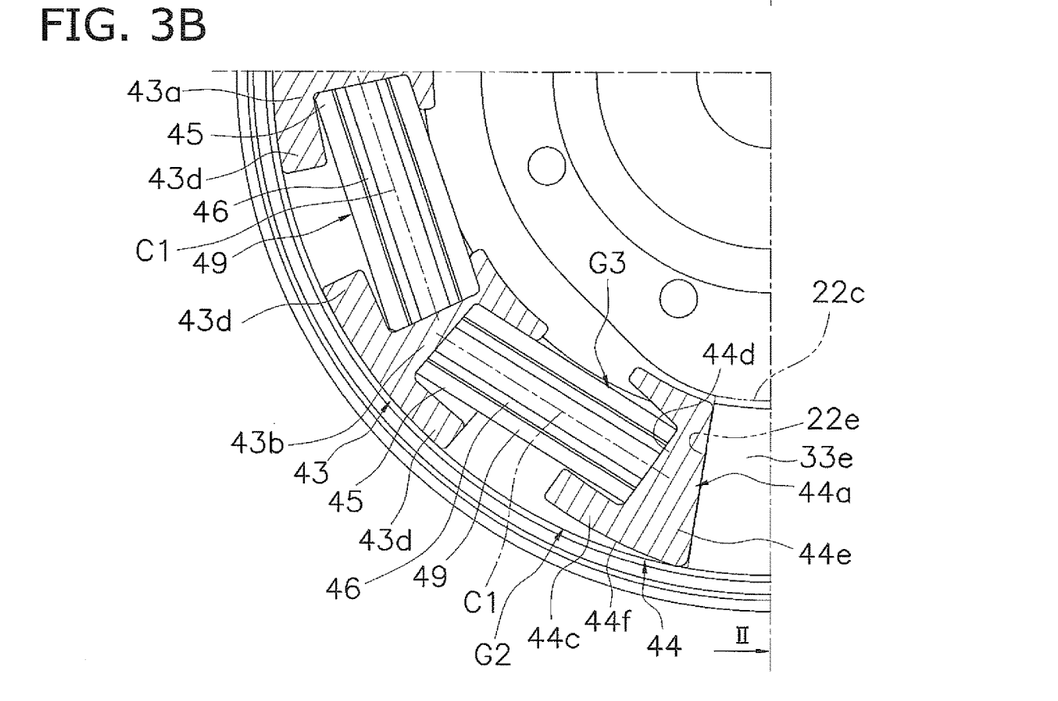
FIG. 3B is a partial enlarged plan view of the flywheel assembly (second posture).

Additionally, each of the first and second end seats 44a and 44b can change in posture between a first posture (see FIG. 3A) and a second posture (see FIG. 3B). For example, each of the first and second end seats 44a and 44b can change in posture from the first posture to the second posture or vice versa by pivoting about a radially outer part 144e of a pressing part 44e (to be described) as a fulcrum.

Each of the first and second end seats 44a and 44b further includes the pressing part 44e and a sliding part 44f. The pressing part 44e is contacted to at least either of the first flywheel 2 (the first plate 21 and the second plate 22) and the second flywheel 3 (the output plate 33). Additionally, the pressing part 44e is pressed by at least either of the first flywheel 2 and the second flywheel 3. For example, as shown in FIG. 3A, one outer peripheral part 21e (one rotation-directional end of each first lateral part 21b) of the first plate body 21a and one outer peripheral part 22e (one rotation-directional end of each second lateral part 22b) of the second plate body 22a are contacted to the pressing part 44e. Additionally, one transmission part 33e of the output plate 33 is contacted to the pressing part 44e. Accordingly, power of the engine is configured to be transmitted to each of the first and second end seats 44a and 44b.

More specifically, when at least either of the first and second end seats 44a and 44b takes the first posture (posture in FIG. 3A), the radially outer part 144e of the pressing part 44e is contactable to the first flywheel 2 and/or the second flywheel 3. Here, the radially outer part 144e of the pressing part 44e is set on a side radially outward of the axis C1 (first center axis) extending in an actuation direction of each spring (the first spring 49, the second spring 48). For example, when at least either of the first and second end seats 44a and 44b takes the second posture (posture in FIG. 3B), the pressing part 44e is entirely contacted to the first flywheel 2 and/or the second flywheel 3. Thus, in the condition that the pressing part 44e is contacted to the first flywheel 2 and/or the second flywheel 3, the power of the engine is configured to be transmitted to each of the first and second end seats 44a and 44b as described above.

It should be noted that the first posture is herein a posture configured to be taken by each of the first and second end seats 44a and 44b when the absolute value of a rotational angle of the second flywheel 3 with respect to the first flywheel 2 is less than a predetermined value. On the other hand, the second posture is a posture configured to be taken by each of the first and second end seats 44a and 44b when the absolute value of the rotational angle of the second flywheel 3 with respect to the first flywheel 2 is greater than or equal to the predetermined value.

The sliding part 44f is a part configured to slide against the first flywheel 2. For example, the sliding part 44f is configured to slide on and along the inner peripheral surface of the tubular part 21c of the first flywheel 2. Accordingly, a hysteresis torque (sliding resistance, rotation-directional resistance) is produced.

More specifically, when the absolute value of the rotational angle of the second flywheel 3 with respect to the first flywheel 2 is less than the predetermined value, the sliding part/parts 44f of at least either of the first and second end seats 44a and 44b is/are entirely slidable on and along the inner peripheral surface of the tubular part 21c of the first flywheel 2. On the other hand, when the absolute value of the rotational angle of the second flywheel 3 with respect to the first flywheel 2 is greater than or equal to the predetermined value, the sliding part/parts 44f of at least either of the first and second end seats 44a and 44b is/are partially slidable on and along the inner peripheral surface of the tubular part 21c of the first flywheel 2.

When at least either of the first and second end seats 44a and 44b changes the posture thereof, a gap is configured to be produced between the first end seat 44a and/or the second end seat 44b and at least either of the first flywheel 2 (the first plate 21 and the second plate 22) and the second flywheel 3 (the output plate 33).

For example, as shown in FIG. 3A, in the first posture, a first gap G1 is configured to be produced between the pressing part 44e and the outer peripheral part 21e of the first plate body 21a (the rotation-directional end of the first lateral part 21b) and/or the transmission part 33e of output plate 33. The first gap G1 is configured to be produced on a side radially inward of the radially outer part 144e of the pressing part 44e. On the other hand, as shown in FIG. 3B, in the second posture, a second gap G2 is configured to be produced between the sliding part 44f and the tubular part 21c of the first plate 21. The second gap G2 is configured to be produced in an opposite direction to the pressing part 44e. Moreover, as shown in FIGS. 3A and 3B, in the first and second postures, a third gap G3 is configured to be produced between the radially inner part of each of the springs (the first spring 49, the second spring 48) and the tubular part 44*c* of each of the first and second end seats 44*a* and 44*b*.

(4) Second Spring Seats 43

As shown in FIG. 1, three second spring seats 43 include a first intermediate seat 43*a*, a second intermediate seat 43*b* and a third intermediate seat 43*c*. The first intermediate seat 43*a* is disposed between one of the first springs 49 and one of the second springs 48. For example, the first intermediate seat 43*a* supports one end of the first spring 49 and that of the second spring 48 in both of the radial direction and the axial direction. The second intermediate seat 43*b* is disposed between the adjacent first springs 49. For example, the second intermediate seat 43*b* supports ends of the adjacent first springs 49 in both of the radial direction and the axial direction. The third intermediate seat 43*c* is disposed between the adjacent second springs 48. For example, the third intermediate seat 43*c* supports ends of the adjacent second springs 48 in both of the radial direction and the axial direction.

When described in detail, each of the first, second and third intermediate seats 43*a*, 43*b* and 43*c* has a tubular shape. Each of the first, second and third intermediate seats 43*a*, 43*b* and 43*c* has two tubular parts 43*d* and two bottom parts 43*e* respectively formed in the tubular parts 43*d*. The end of the first spring 49 is inserted into one of the tubular parts 43*d* of the first intermediate seat 43*a*, while the tip of the end of the first spring 49 is contacted to the bottom part 43*e* of the tubular part 43*d*. The end of the second spring 48 is inserted into the other of the tubular parts 43*d* of the first intermediate seat 43*a*, while the tip of the end of the second spring 48 is contacted to the bottom part 43*e* of the tubular part 43*d*. The ends of the first springs 49 are respectively inserted into the tubular parts 43*d* of the second intermediate seat 43*b*, while the tips of the ends of the first springs 49 are respectively contacted to the bottom parts 43*e* of the tubular parts 43*d*. The ends of the second springs 48 are respectively inserted into the tubular parts 43*d* of the third intermediate seat 43*c*, while the tips of the ends of the second springs 48 are respectively contacted to the bottom parts 43*e* of the tubular parts 43*d*.

Thus, the tubular parts 43*d* are formed in each of the second spring seats 43, i.e., each of the first, second and third intermediate seats 43*a*, 43*b* and 43*c*, and the respective springs (the first springs 49, the second springs 48) are mounted to the tubular parts 43*d*. Accordingly, the second spring seats 43 can be entirely enhanced in their strength, and can reliably support the respective springs.

It should be noted that in the present exemplary embodiment, the first and second springs 49 and 48 and the first and second spring seats 44 and 43 are formed such that the intervals among adjacent spring seats 44 and 43 can be substantially equal to each other. When described in detail, the length of each first spring and that of each second spring 48, and further, the circumferential length of the outer peripheral part of each first spring seat 44 and that of the outer peripheral part of each second spring seat 43 are set such that the circumferential intervals among adjacent spring seats 44 and 43 can be substantially equal to each other.

<Actions>

Using FIGS. 4 to 8, an action of the flywheel assembly 1 will be explained. It should be noted that the flywheel assembly 1 according to the present exemplary embodiment includes two groups of the springs 49 and 48. A single spring group includes two first springs 49 and two second springs 48. Explanation will be hereinafter made by focusing on a single spring group in order to make the explanation easy.

Figure 4:
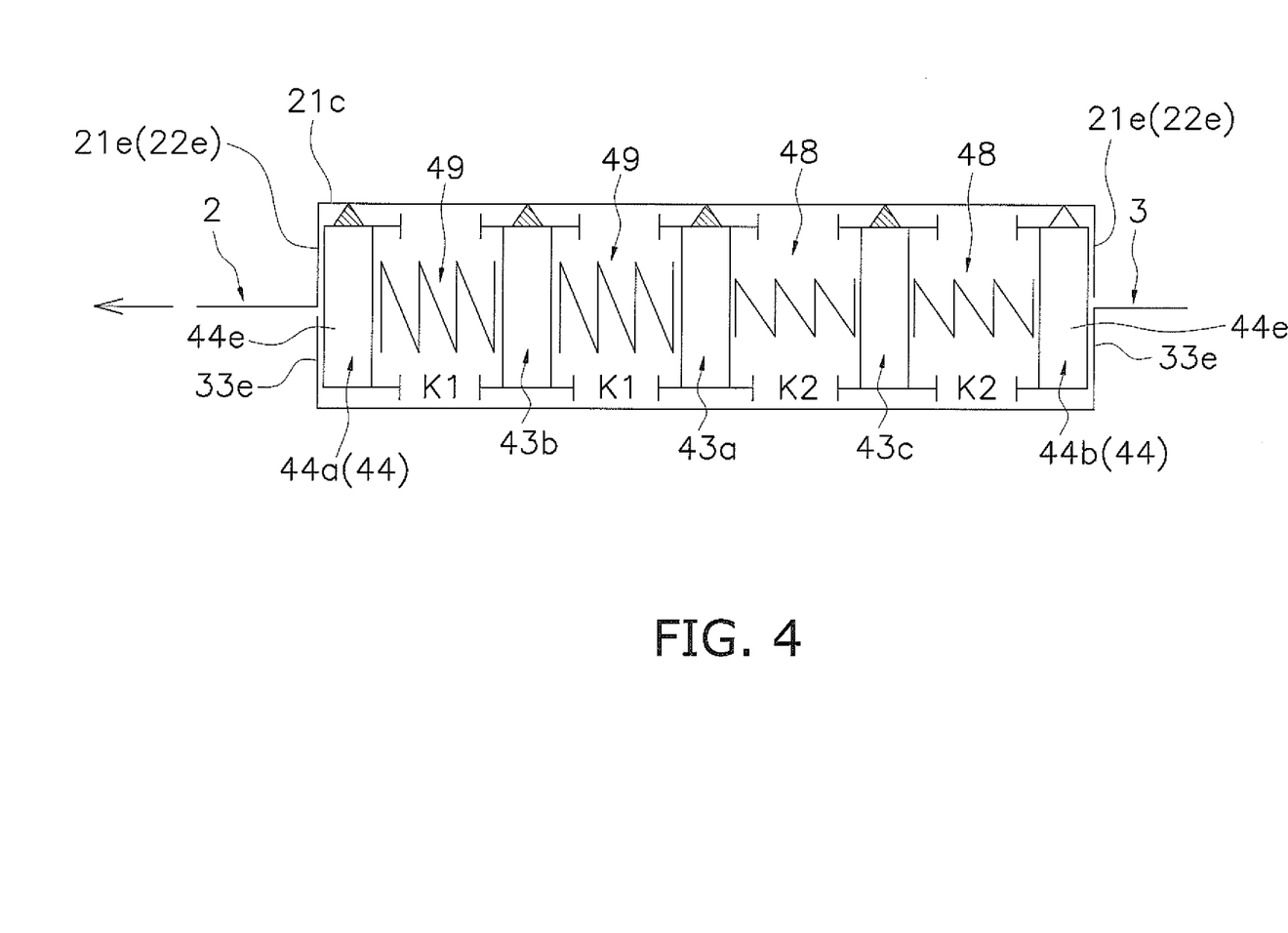
FIG. 4 is a mechanical circuit diagram of the flywheel assembly (neutral state; a circuit is being actuated in a first stage on a positive side).

The flywheel assembly 1 is set in a state shown in FIG. 4 in the neutral state that power is not being transmitted from the engine to the clutch disc assembly through the flywheel assembly 1. When the clutch disc assembly is pressed onto the second flywheel in the state, power is transmitted from the engine to the transmission through the flywheel assembly 1 and clutch disc assembly.

Drive-Side Torsional Characteristic

First, power of the engine is inputted into the flywheel assembly 1, and the first flywheel 2 begins to be rotated to the drive side (positive side; R2 direction) with respect to the second flywheel 3. Accordingly, the first springs 49 and the second springs 48 begin to be compressed between the first flywheel 2 and the second flywheel 3. When described in more detail, in the state shown in FIG. 4, the first springs 49 and the second springs 48 are compressed in the rotational direction between the first flywheel 2 (the outer peripheral part 21*e* of the first plate body 21*a* and the outer peripheral part 22*e* of the second plate body 22*a* on the right side in FIG. 4) and the second flywheel 3 (the transmission part 33*e* on the left side of FIG. 4).

Additionally, in this case, the first spring seat 44 (the first end seat 44*a*) and the three second spring seats 43 (the first, second and third intermediate seats 43*a*, 43*b* and 43*c*) are pressed onto and slid against the inner peripheral surface of the tubular part 21*c* of the first flywheel 2 by a centrifugal force. Accordingly, a hysteresis torque is produced by a friction force produced between the respective spring seats 44 and 43 and the inner peripheral surface of the tubular part 21*c* of the first flywheel 2. In this case, the flywheel assembly 1 is configured to be actuated in a range of NC1 in FIG. 8, and the first end seat 44*a* takes the first posture.

It should be noted that parts contributing to produce the hysteresis torque (the outer peripheral parts of the spring seats 44 and 43) are depicted with hatched lines in FIGS. 4 to 7.

Figure 5:
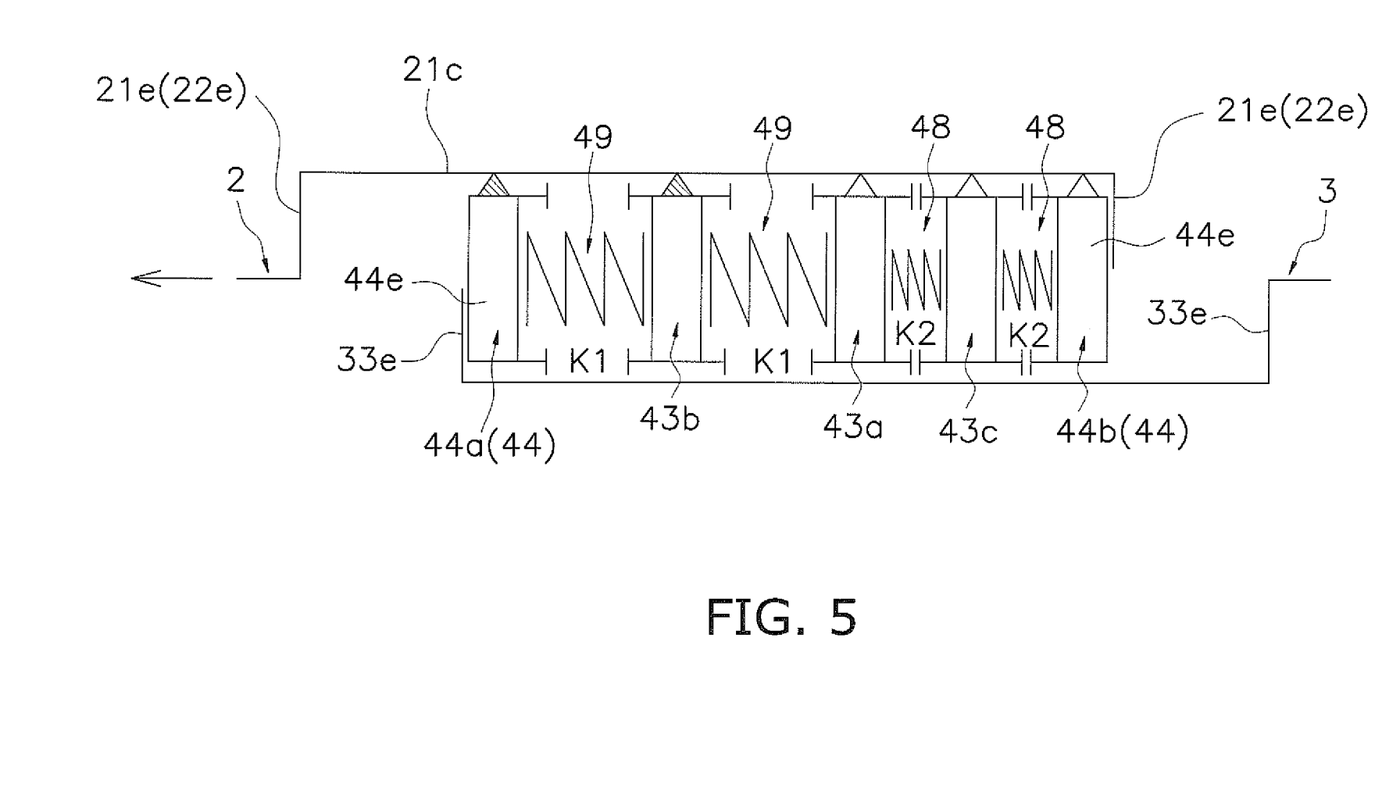
FIG. 5 is a mechanical circuit diagram of the flywheel assembly (the circuit is being actuated in a second stage on the positive side).
Figure 6:
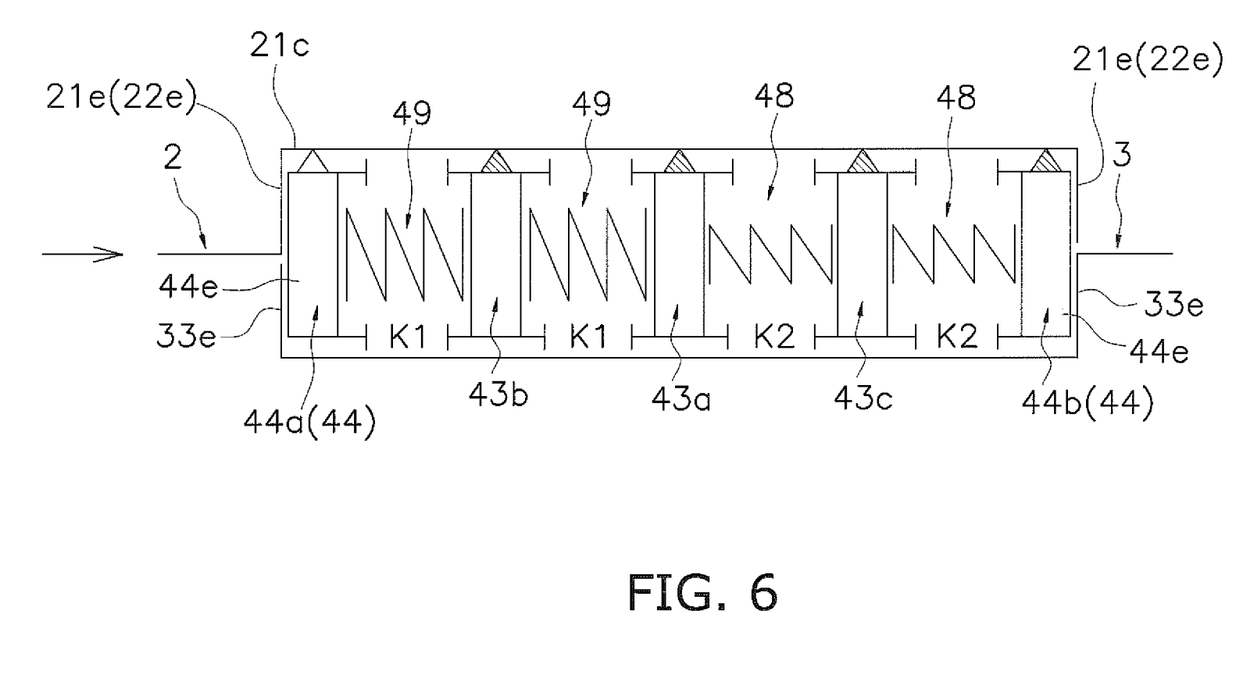
FIG. 6 is a mechanical circuit diagram of the flywheel assembly (neutral state; the circuit is being actuated in a first stage on a negative side).
Figure 8:
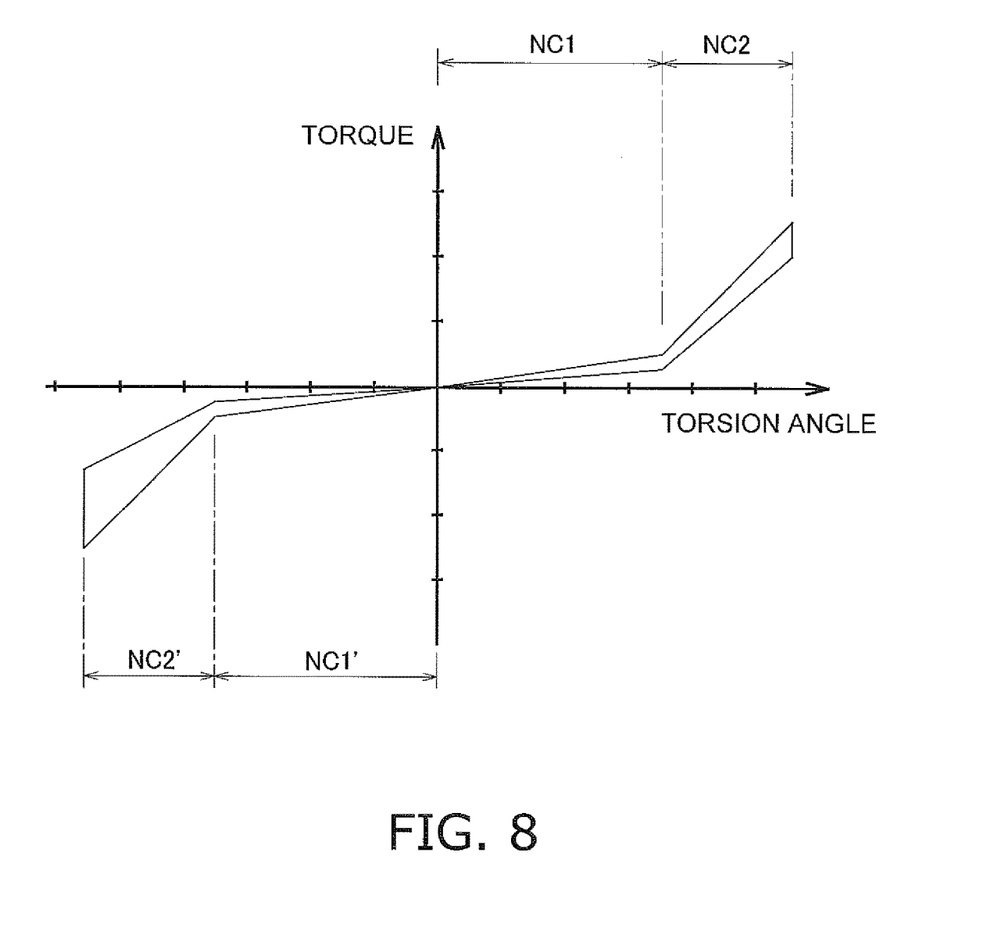
FIG. 8 is a characteristic diagram of the flywheel assembly.

Next, when the rotational angle (torsion angle) of the second flywheel 3 with respect to the first flywheel 2 increases, the flywheel assembly 1 is configured to be actuated in a range of NC2 in FIG. 8. In this case, as shown in FIG. 5, the tubular part 44*c* of the second end seat 44*b* and one tubular part 43*d* of the third intermediate seat 43*c* are contacted in the rotational direction. In other words, the second end seat 14*b* is contacted to the third intermediate seat 43*c*. Additionally, the other tubular part 43*d* of the third intermediate seat 43*c* and one tubular part 43*d* of the first intermediate seat 43*a* are contacted in the rotational direction. Specifically, adjacent two tubular parts 43*d* are contacted to each other at the radially outer parts thereof. Thus, power is transmitted from the first flywheel 2 to the second flywheel 3, while the tubular part 44*c* of the second end seat 44*b* and one tubular part 43*d* of the third intermediate seat 43*c* are contacted; and further, the other tubular part 43*d* of the third intermediate seat 43*c* and one tubular part 43*d* of the first intermediate seat 43*a* are contacted. In the condition, one first spring 49 disposed between the first end seat 44*a* and the second intermediate seat 43*b* and the other first spring 49 disposed between the second intermediate seat 43*b* and the first intermediate seat 43*a* are to be compressed.

Additionally, at this time, the first end seat 44*a* and the second intermediate seat 43*b* (hatched parts in FIG. 5) are pressed onto and slid against the inner peripheral surface of the tubular part 21*c* of the first flywheel 2 by a centrifugal force. Accordingly, a hysteresis torque is produced by a friction force produced between the inner peripheral surface of the tubular part 21*c* of the first flywheel 2 and both of the first end seat 44*a* and the second intermediate seat 43*b*.

Thus, the hysteresis torque is produced by the friction force produced between the first flywheel 2 and both of the first end seat 44a and the second intermediate seat 43b.

In this case, three seats (the second end seat 44b, the third intermediate seat 43c and the first intermediate seat 43a) are not slid against the first flywheel 2. Hence, a hysteresis torque is not produced by these seats. In other words, when the seat members are contacted on the output side of power, a hysteresis torque is not produced by these seat members. Strictly speaking, there are chances of producing a minute hysteresis torque. However, such chances are not herein taken into consideration.

As described above, when the flywheel assembly 1 is actuated in the range of NC2 in FIG. 8 and the absolute value of the rotational angle (torsion angle) of the second flywheel 3 with respect to the first flywheel 2 is less than a predetermined value, as shown in FIGS. 3A and 5, the radially outer part 144e of the pressing part 44e of the first spring seat 44 (the first end seat 44a) is configured to be pressed by the transmission part 33e of the second flywheel 3. In this case, the first end seat 44a is configured to be actuated in the first posture (posture in FIG. 3A).

As shown in FIG. 3A, in the first posture, the transmission part 33e of the second flywheel 3 is partially contacted to and presses the radially outer part 144e of the pressing part 44e of the first end seat 44a. In other words, in this condition, the transmission part 33e of the second flywheel 3 presses the radially outer part 144e of the pressing part 44e of the first end seat 44a, while the first gap G1 is produced between the pressing part 44e and the transmission part 33e of the second flywheel 3. Additionally, in this condition, the sliding part 44f of the first end seat 44a is entirely contacted to the inner peripheral surface of the tubular part 21c of the first flywheel 2, and is slid on and along the inner peripheral surface of the tubular part 21c of the first flywheel 2. Thus, in the first posture, at the sliding part 44f, the first end seat 44a is entirely contacted to and slid against the tubular part 21c of the first flywheel 2 by a centrifugal force.

Thus, in the first posture, the sliding part 44f of the first end seat 44a is entirely contacted to the inner peripheral surface of the tubular part 21c of the first flywheel 2. However, when the radially outer part 144e of the pressing part 44e of the first end seat 44a is assumed as an input position of power, a radially inward force component of power becomes larger in the first posture than in a posture taken when the pressing part 44e of the first end seat 44a is pressed while the first gap G1 is not being produced. In other words, a centrifugal force acting on the first end seat 44a can be reduced. Accordingly, in the first end seat 44a, a friction force is reduced, and hence, a hysteresis torque attributed to the friction force is also reduced. In other words, attenuation performance by the first springs 49 can be enhanced.

On the other hand, when the flywheel assembly 1 is actuated in the range of NC2 in FIG. 8 and the absolute value of the rotational angle (torsion angle) of the second flywheel 3 with respect to the first flywheel 2 is greater than or equal to the predetermined value, the first spring seat 44 (the first end seat 44a) is changed in posture from the first posture (see FIG. 3A) to the second posture (see FIG. 31B) in accordance with increase in centrifugal force. In other words, in this case, the first end seat 44a takes the second posture.

As shown in FIG. 3B, in the second posture, the transmission part 33e of the second flywheel 3 is entirely contacted to and presses the pressing part 44e of the first end seat 44a. Additionally, in this condition, the sliding part 44f of the first end seat 44a is partially contacted to the inner peripheral surface of the tubular part 21c of the first flywheel 2 by a centrifugal force, and is slid on and along the inner peripheral surface of the tubular part 21c of the first flywheel 2. In other words, in this condition, the sliding part 44f of the first end seat 44a is slid on and along the inner peripheral surface of the tubular part 21c of the first flywheel 2, while the second gap G2 is produced between the sliding part 44f of the first end seat 44a and the tubular part 21c of the first plate 21. Thus, in the second posture, only part of the sliding part 44f of the first end seat 44a is slid on and along the inner peripheral surface of the tubular part 21c of the first flywheel 2.

Here, part of the sliding part 44f includes parts closer to the transmission part 33e of the second flywheel 3 in the sliding part 44f (a part closer to the outer peripheral part 21e of the first plate body 21a and a part closer to the outer peripheral part 22e of the second plate body 22a).

With the aforementioned construction, the present flywheel assembly enhances attenuation performance of springs (the first springs 49) in wide rotational speed ranges.

Torsional Characteristic on Anti-Drive Side

When the first flywheel 2 begins to be rotated oppositely to the drive side (negative side, R1 direction) with respect to the second flywheel 3, the first springs 49 and the second springs 48 begin to be compressed between the first flywheel 2 and the second flywheel 3. When described in more detail, in the condition of FIG. 6, the first springs 49 and the second springs 48 are compressed in the rotational direction between the first flywheel 2 (the outer peripheral part 21e of the first plate body 21a and the outer peripheral part 22e of the second plate body 22a on the left side in FIG. 6) and the second flywheel 3 (the transmission part 33e on the right side in FIG. 6).

Additionally, in this case, the first spring seat 44 (the second end seat 44b) and the three second spring seats 43 (the first, second and third intermediate seats 43a, 43b and 43c) are pressed onto and slid against the inner peripheral surface of the tubular part 21c of the first flywheel 2 by a centrifugal force. Accordingly, a hysteresis torque is produced by a friction force produced between the respective spring seats 44 and 43 and the inner peripheral surface of the tubular part 21c of the first flywheel 2. In this case, the flywheel assembly 1 is configured to be actuated in a range of NC1' in FIG. 8, and the second end seat 44b takes the first posture.

Figure 7:
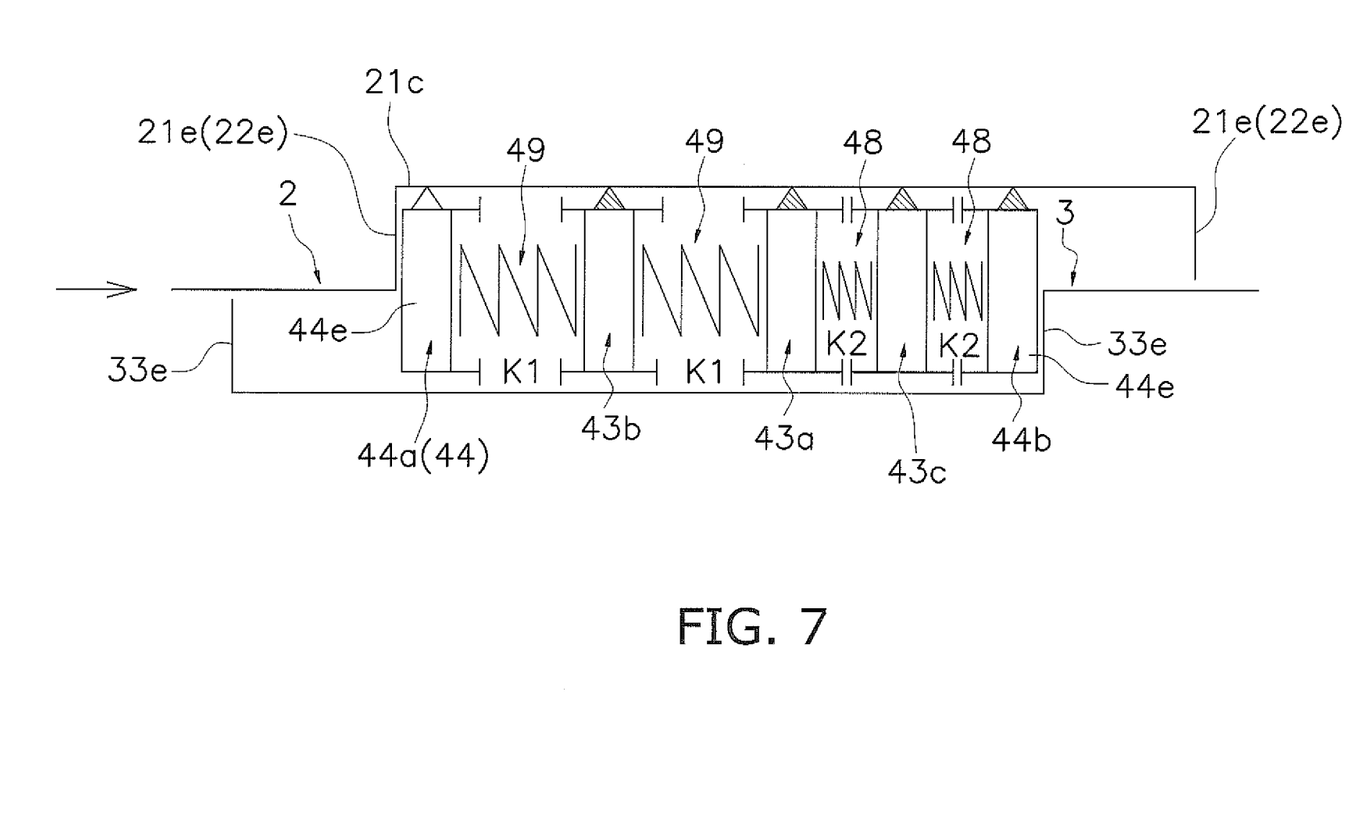
FIG. 7 is a mechanical circuit diagram of the flywheel assembly (the circuit is being actuated in a second stage on the negative side).

Next, when the rotational angle (torsion angle) of the second flywheel 3 with respect to the first flywheel 2 increases, the flywheel assembly 1 is configured to be actuated in a range of NC2' in FIG. 8. In this case, as shown in FIG. 7, the tubular part 44c of the second end seat 44b and one tubular part 43d of the third intermediate seat 43c are contacted in the rotational direction. Additionally, the other tubular part. 43d of the third intermediate seat 43c and one tubular part 43d of the first intermediate seat 43a are contacted in the rotational direction. Specifically, adjacent two tubular parts 43d are contacted to each other at the radially outer parts thereof.

Thus, power is transmitted from the first flywheel 2 to the second flywheel 3 through the two first springs 49, while the tubular part 44c of the second end seat 44b and one tubular part 43d of the third intermediate seat 43c are contacted; and further, the other tubular part 43d of the third intermediate seat 43c and one tubular part 43d of the first intermediate seat 43a are contacted.

It should be noted that the second end seat 14b is capable of taking both the first posture and the second posture. In this case, however, the second end seat 44b, the third intermediate seat 43c and the first intermediate seat 43a are contacted in the rotational direction. Hence, the second end seat 44b is kept in the first posture.

Additionally, in this condition, one first spring 49 disposed between the first end seat 44a and the second intermediate seat 43b and the other first spring 49 disposed between the second intermediate seat 43b and the first intermediate seat 43a are to be compressed.

Moreover, at this time, the first spring seat 44 (the second end seat 44b) and the three second spring seats 43 (the first, second and third intermediate seats 43a, 43b and 43c) are pressed onto and slid against the inner peripheral surface of the tubular part 21c of the first flywheel 2 by a centrifugal force.

Accordingly, a hysteresis torque is produced by a friction force produced between the respective spring seats 44 and 43 and the inner peripheral surface of the tubular part 21c of the first flywheel 2. Thus, the hysteresis torque is produced by the friction force produced between the respective spring seats 44 and 43 and the first flywheel 2.

In this case, three seats (the second end seat 44b, the third intermediate seat 43c and the first intermediate seat 43a) are contacted. However, while being thus contacted to each other, the three seats are pressed onto and slid against the inner peripheral surface of the tubular part 21c of the first flywheel 2. A hysteresis torque is thereby produced. Therefore, the hysteresis torque on the negative side is greater than that on the positive side. Accordingly, when the torsion angle is large, resonance inhibition performance exerted by the torsional characteristic on the negative side is greater than that exerted by the torsional characteristic on the positive side.

As described above, when the flywheel assembly 1 is actuated in the range of NC2' in FIG. 8, the first spring seat 44 (the second end seat 44b) is kept in the first posture. Hence, unlike in driving on the positive side, the effect of reducing a hysteresis torque is not exerted in the range of NC2' in FIG. 8.

Other Exemplary Embodiments

The present invention is not limited to the aforementioned exemplary embodiment, and a variety of changes and modifications can be made without departing from the scope of the present invention.

(1) The aforementioned exemplary embodiment has described that the first spring seats/seat 44 (the first end seat 44a and/or the second end seat 44b) are/is configured to be changed in posture between the first and/or second springs 49 and/or 48 and the second flywheel 3 (the transmission part 33e). Instead of this configuration, the first spring seats/seat 44 (the first end seat 44a and/or the second end seat 44b) may be configured to be changed in posture between the first and/or second springs 49 and/or 48 and the first flywheel 2 (the outer peripheral part 21e of the first plate body 21a and the outer peripheral part 22e of the second plate body 22a). Even in this case, it is possible to achieve advantageous effects similar to those achieved by the aforementioned exemplary embodiment.

(2) The aforementioned exemplary embodiment has exemplified the construction that two first springs 49 have the same magnitude of stiffness K1. However, even when two first springs 49 have different magnitudes of stiffness K1, the first spring seats/seat 44 (the first end seat 44a and/or the second end seat 44b) can be changed in posture similarly to the aforementioned exemplary embodiment. Even in this case, it is possible to achieve advantageous effects similar to those achieved by the aforementioned exemplary embodiment.

(3) The aforementioned exemplary embodiment has exemplified the construction that two second springs 48 have the same magnitude of stiffness K2. However, even when two second springs 48 have different magnitudes of stiffness K2, the first spring seats/seat 44 (the first end seat 44a and/or the second end seat 44b) can be changed in posture similarly to the aforementioned exemplary embodiment. Even in this case, it is possible to achieve advantageous effects similar to those achieved by the aforementioned exemplary embodiment.

(4) The aforementioned exemplary embodiment has exemplified the construction that the flywheel assembly 1 includes two first springs 49 and two second springs 48 in each spring group. However, the number of the first springs 49 and the number of the second springs 48 may be arbitrarily set. Even in this case, it is possible to achieve advantageous effects similar to those achieved by the aforementioned exemplary embodiment.

INDUSTRIAL APPLICABILITY

The present invention is widely applicable to flywheel assemblies.

REFERENCE SIGNS LIST

1 Flywheel assembly
2 First flywheel (exemplary first rotary member)
3 Second flywheel (exemplary second rotary member)
4 Damper mechanism
43 Second spring seat
43a First intermediate seat
43b Second intermediate seat
43c Third intermediate seat
44 First spring seat (exemplary seat member)
44a First end seat
44b Second end seat
44c Tubular part (exemplary recess)
44e Pressing part
44f Sliding part
144e Part of pressing part, radially outer part of pressing part
48 Second spring (exemplary elastic member)
49 First spring (exemplary elastic member)
G1 First gap
G2 Second gap
G3 Third gap

The invention claimed is:
1. A flywheel assembly, comprising:
a first rotary member into which a power of an engine is inputted;
a second rotary member rotatably disposed with respect to the first rotary member;
an elastic member elastically coupling the first rotary member and the second rotary member in a rotational direction; and
a plurality of seat members separately disposed between the elastic member and at least either of the first rotary member and the second rotary member, wherein
at least one of the plurality of seat members includes a pressing part and a sliding part, the pressing part configured to be pressed by the at least either of the first rotary member and the second rotary member, the sliding part configured to slide against the first rotary member, and the at least one of the plurality of seat members is disposed to be changeable in posture between a first posture and a second posture, the first posture causing a radially outer part of the pressing part to be contacted to the at least either of the first rotary member and the second rotary member and causing an outer peripheral part of the sliding part to entirely slide against the first rotary member when an absolute value of a rotational angle of the second rotary member with respect to the first rotary member is less than a predetermined value, the second posture causing the sliding part to partially slide against the first rotary member when the absolute value of the rotational angle of the second rotary member with respect to the first rotary member is greater than or equal to the predetermined value.

2. The flywheel assembly recited in claim 1, wherein the first posture causes the pressing part to be partially contacted to the at least either of the first rotary member and the second rotary member on a side radially outward of an axis extending in a direction in which the elastic member is actuated.

3. The flywheel assembly recited in claim 1, wherein the at least one of the plurality of seat members is configured to be changed in posture between the first posture and the second posture by pivoting about the radially outer part of the pressing part as a fulcrum.

4. The flywheel assembly recited in claim 1, wherein the first posture is configured to produce a first gap between the pressing part and the at least either of the first rotary member and the second rotary member and on a side radially inward of the radially outer part of the pressing part, and the second posture is configured to produce a second gap extending between the sliding part and the first rotary member in an opposite direction to the pressing part.

5. The flywheel assembly recited in claim 1, wherein the seat members disposed between the elastic member and at least either of the first rotary member and the second rotary member include recesses for holding ends of the elastic member, and each of the first posture and the second posture is configured to produce a third gap between at least one of the recesses and a radially inner part of the elastic member.

6. A flywheel assembly, comprising:

a first rotary member into which a power of an engine is inputted;

a second rotary member rotatably disposed with respect to the first rotary member;

an elastic member elastically coupling the first rotary member and the second rotary member in a rotational direction; and a plurality of seat members separately disposed between the elastic member and at least either of the first rotary member and the second rotary member, wherein at least one of the plurality of seat members includes a pressing part and a sliding part, the pressing part being configured to be pressed by the at least either of the first rotary member and the second rotary member, the sliding part being configured to slide against the first rotary member, the at least one of the plurality of seat members is disposed to be changeable in posture between a first posture and a second posture, the first posture causing a radially outer part of the pressing part to be contacted to the at least either of the first rotary member and the second rotary member when an absolute value of a rotational angle of the second rotary member with respect to the first rotary member is less than a predetermined value, the second posture causing the sliding part to partially slide against the first rotary member when the absolute value of the rotational angle of the second rotary member with respect to the first rotary member is greater than or equal to the predetermined value, and the at least one of the plurality of seat members is configured to be changed in posture between the first posture and the second posture by pivoting about the radially outer part of the pressing part as a fulcrum.

* * * * *